US 7,542,658 B2

(12) United States Patent
Watanabe

(10) Patent No.: US 7,542,658 B2
(45) Date of Patent: Jun. 2, 2009

(54) APPARATUS AND PROGRAM FOR UPDATING A RESERVATION OF A BROADCAST PROGRAM BASED ON PROGRAM GUIDE DATA

(75) Inventor: Akira Watanabe, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 672 days.

(21) Appl. No.: 11/018,139

(22) Filed: Dec. 20, 2004

(65) Prior Publication Data

US 2005/0141871 A1 Jun. 30, 2005

(30) Foreign Application Priority Data

Dec. 26, 2003 (JP) ............... 2003-435634

(51) Int. Cl.
*H04N 5/76* (2006.01)
(52) U.S. Cl. .......................... 386/83; 725/50
(58) Field of Classification Search .............. 725/56, 725/39, 40, 44, 52, 58, 53, 61; 386/83; 348/565
See application file for complete search history.

(56) References Cited

U.S. PATENT DOCUMENTS 6,252,629 B1    6/2001  Takatori
6,795,639 B1    9/2004  Lord
2001/0051037 A1  12/2001 Safadi et al.
2003/0028877 A1  2/2003  Everett et al.
2003/0106060 A1* 6/2003  Inoue .................. 725/56
2005/0055715 A1* 3/2005  Minnick et al. .......... 725/58

FOREIGN PATENT DOCUMENTS

JP    2000341156      * 12/2000
JP    2002-232805 A     8/2002
JP    2002-252789 A     9/2002
JP    2003333479 A    * 11/2003
WO    WO 02/25936 A2    3/2002

* cited by examiner

*Primary Examiner*—David E Harvey
(74) *Attorney, Agent, or Firm*—Frishauf, Holtz, Goodman & Chick, P.C.

(57) ABSTRACT

Contents reserved to be recorded by a user manually operating a switch unit are stored in an EPG/reservation information memory as first reservation information. A CPU having acquired EPG data by a TV unit or a communication interface stores the acquired EPG data in the memory. By referring to the stored EPG data, program information corresponding to the stored first reservation information is extracted, and an ID of the extracted program information is added to the first reservation information. Therefore, the subsequent change of a broadcast schedule is made by referring to the EPG data to be acquired later. Even if a manual reservation is made, the user can reliably view or record a program desired to be reserved.

4 Claims, 17 Drawing Sheets

FLOW CHART OF GENERAL PROCESSES

FLOW CHART OF INITIAL SETTING PROCESS

FLOW CHART OF SWITCHING PROCESS

FLOW CHART OF SWITCHING PROCESS (CONTINUED)

FLOW CHART OF RECEIVING PROCESS

FLOW CHART OF RESERVATION CORRECTING PROCESS

FLOW CHART OF RESERVATION CORRECTING PROCESS (CONTINUED)

FLOW CHART OF RESERVATION
CORRECTING PROCESS (CONTINUED)

FLOW CHART OF RECORDING RESERVATION PROCESS

FLOW CHART OF RECORDING RESERVATION PROCESS (CONTINUED)

FLOW CHART OF RECORDING PROCESS

FLOW CHART OF PLAYING BACK PROCESS

FLOW CHART OF COMMUNICATION PROCESS

FLOW CHART OF TIMER PROCESS

VIEW ILLUSTRATING DIFFERENCE
IN CONFIGURATION ACCORDING TO METHOD
FOR RESERVING RESERVATION INFORMATION

FIG.16A

MANUAL

| ID | NONE |
|---|---|
| DATE | AUGUST 4 |
| START TIME | 19:00 |
| RECORDING TIME | 54 MINUTES |
| CHANNEL | 12 CH |

FIG.16B

EPG

| ID | 20910412 |
|---|---|
| DATE | AUGUST 4 |
| START TIME | 19:00 |
| RECORDING TIME | 54 MINUTES |
| CHANNEL | 12 CH |

FIG.17

VIEW ILLUSTRATING METHOD FOR DIVIDING RESERVATION
INFORMATION FOR RESERVING A PLURALITY OF PROGRAMS

SOURCE RESERVATION
INFORMATION

| ID | NONE |
|---|---|
| DATE | AUGUST 4 |
| START TIME | 19:00 |
| RECORDING TIME | 114 MINUTES |
| CHANNEL | 12 CH |

DIVIDE
(EPG BASED)

RESERVATION INFORMATION
ON PROGRAM 1

| ID | 20910412 |
|---|---|
| DATE | AUGUST 4 |
| START TIME | 19:00 |
| RECORDING TIME | 60 MINUTES |
| CHANNEL | 12 CH |

RESERVATION INFORMATION
ON PROGRAM 2

| ID | 30240412 |
|---|---|
| DATE | AUGUST 4 |
| START TIME | 20:00 |
| RECORDING TIME | 54 MINUTES |
| CHANNEL | 12 CH |

FIG.18

VIEW ILLUSTRATING WARNING SCREEN

```
■■RECORDING RESERVATION■■
   07/31  6ch
          20:00-20:54
   08/01  4ch
          23:00-23:50
   08/04  10ch
          19:00-20:30
   08/06  8ch
```

FLOW CHART OF RESERVATION CORRECTING PROCESS
IN ANOTHER EMBODIMENT (EXTRACTED)

APPARATUS AND PROGRAM FOR UPDATING A RESERVATION OF A BROADCAST PROGRAM BASED ON PROGRAM GUIDE DATA

CROSS-REFERENCE TO RELATED APPLICATIONS

This application is based upon and claims the benefit of priority from prior Japanese Patent Application No. 2003-435634, filed Dec. 26, 2003, the entire contents of which are incorporated herein by reference.

BACKGROUND OF THE INVENTION

1. Field of the Invention

The present invention relates to a program reservation apparatus for reserving a broadcast program for viewing or recording.

2. Description of the Related Art

In a digital broadcast, a program chart called an EPG (Electronic Program Guide) is transmitted at any time. The EPG includes program information which indicates its ID (identification information) or broadcast date and time (a time interval from start date and time of broadcast to end date and time of broadcast) for each broadcast program. In this manner, the EPG can be not only viewed as a program chart, but also can be used for reservation for the purpose of viewing or recording a broadcast program.

A program to be broadcast is not broadcast in any case at a predetermined date and time of broadcast by virtue of a reason such as extension of another program or broadcast of a special program. A change of schedule caused by such a reason is reflected in an EPG to be transmitted. A program reserved by the EPG can specify the corresponding program information contained in the received EPG by means of an ID registered during reservation. Thus, such a change in broadcast can be properly made in reservation contents.

However, the above EPG consists of 8-day information. In order reserve to a program scheduled to be broadcast the 8th day or later, the associated reservation contents, namely, channel or reserved date and time (time interval from start date and time to end date and time) must be manually set. However, as described above, the predetermined broadcast contents are occasionally changed. Thus, even if a manual reservation has been made, a program to be reserved cannot be reliably viewed or recorded.

BRIEF SUMMARY OF THE INVENTION

It is an object of the present invention to provide a program reservation apparatus reliably viewing or recording a program desired to be reserved even if a program broadcast schedule is changed after reservation has been made.

According to an embodiment of the present invention, a program reservation apparatus comprises:
 reservation setting means for setting a channel and a reserved date and time which is a time interval between a start date and time and an end date and time to make a reservation of a program;
 data storage means capable of storing first reservation data indicating contents reserved by the reservation setting means;
 information acquiring means for acquiring program guide information for a program to be broadcast, the program guide information including identification information on the program and program information indicating a broadcast date and time which is a time interval between a broadcast start date and time and a broadcast end date and time;
 data extracting means for extracting the first reservation data which corresponds to the program information from among items of the first reservation data stored in the data storage means by referring to the program guide information that is acquired by the information acquiring means; and
 reservation update means for, to the first reservation data extracted by the data extracting means, adding identification information contained in program information which corresponds to the first reservation data, and storing in the data storage means the first reservation data to which the identification information has been added, as second reservation data.

According to another embodiment of the present invention, a program reservation apparatus comprises:
 reservation setting means for setting a channel and a reserved date and time which is a time interval between a start date and time and an end date and time to make a reservation of a program;
 data storage means capable of storing reservation data indicating contents reserved by the reservation setting means;
 information acquiring means for acquiring program guide information for a program to be broadcast, the program guide information including identification information on the program and program information indicating a broadcast date and time which is a time interval between a broadcast start date and time and a broadcast end date and time;
 data extracting means for extracting the reservation data which corresponds to the program information from among items of the reservation data stored in the data storage means by referring to the program guide information that is acquired by the information acquiring means; and
 reservation contents determining means for determining whether or not contents indicated by the reservation data extracted by the data extracting means match contents indicated by the corresponding program information and notifying a result of determination.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIGS. 16A and 16B are views each illustrating a difference in configuration using a method for reserving reservation information;

FIG. 17 is a view illustrating a method for dividing reservation information for reserving a plurality of programs;

FIG. 18 is a view illustrating a warning screen; and

DETAILED DESCRIPTION OF THE INVENTION

Figure 1:
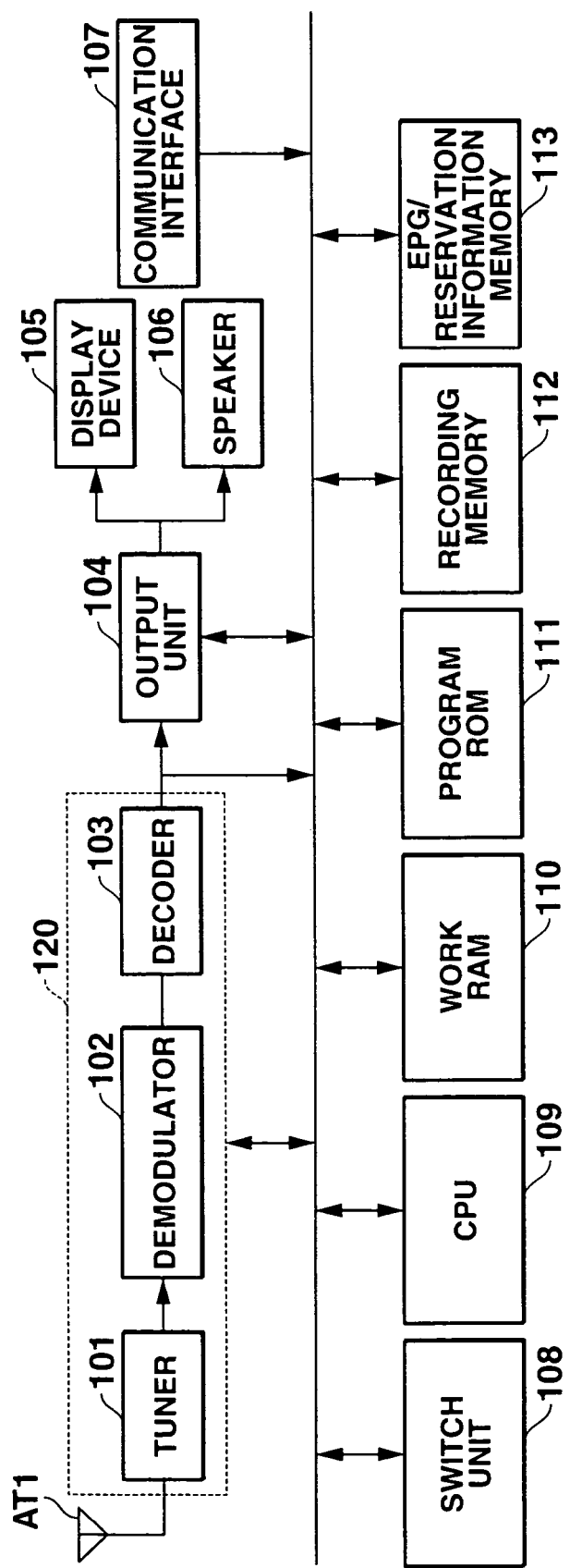
FIG. 1 is a diagram showing a configuration of a program recording apparatus with a program reservation apparatus according to an embodiment of the present invention.

An embodiment of a program reservation apparatus according to the present invention will now be described with reference to the accompanying drawings. FIG. 1 is a diagram showing a configuration of a program recording apparatus with a program reservation apparatus according to an embodiment of the present invention. The program recording apparatus is capable of receiving a program for a digital broadcast and recording the program.

As shown in FIG. 1, the program recording apparatus comprises a tuner 101, a demodulator 102, a decoder 103, an output unit 104, a switch (SW) unit 108, a CPU 109, a work RAM 110, a program ROM 111, a recording memory 112, and an EPG/reservation information memory 113. The tuner 101 receives a set channel from among radio waves for broadcast by an antenna AT1 and outputs a received channel signal. The demodulator 102 demodulates the received signal. The decoder 103 decodes the demodulated signal and outputs video data and audio data, respectively. The output unit 104 causes a display device 105 to display video data input from the decoder 103 and D/A converts audio data input from the decoder 103, and outputs the D/A converted audio data to a speaker 106, thereby generating a sound. The communication interface 107 carries out data transmission and reception between the interface 107 and an external device (not shown) via a communication network. The switch unit 108 has a variety of switches. The CPU 109 makes control of whole apparatus. The work RAM 110 is used by the CPU 109 for temporary storage. The program ROM 111 stores a program executed by the CPU 109 or a variety of control data. The recording memory 112 is a medium drive device for providing access to a hard disk device or a removable recording medium such as DVD. The EPG/reservation information memory 113 (hereinafter, referred to as "information memory") is provided for storing EPG to be transmitted by a digital broadcast or reservation information. The above tuner 101, demodulator 102, and decoder 103 are generally referred to as a TV unit 120.

A broadcast selected by the tuner 101 is a digital broadcast. In that digital broadcast, data broadcast is carried out in addition to a video broadcast for outputting video or audio, and various data including EPG data are transmitted by the data broadcast. Data on that data broadcast is sent to the CPU 109 after demodulated by the demodulator 102. The EPG data is stored in the information memory 113 by the CPU 109. The other data, i.e., video and audio data transmitted as a video broadcast are sent to and decoded by the decoder 103, and the video data and audio data obtained by that decoding are sent to the display device 104. In the case where recording is carried out, data after demodulated or data after decoded are sent to and stored in the recording memory 112. In this manner, playback of the recorded data is carried out by reading out the data from the memory 112; sending it to the decoder 103; and outputting the decoded video data and audio data to the output unit 104 if it is data after modulated. If it is data after decoded, this playback is carried out by reading out the data from the memory 112 and sending it to the output unit 104. Here, only the latter case will be assumed.

The communication interface 107 is intended to make communication via, for example, a telephone network, a cellular phone network, or a PHS (personal handy-phone system) network, without being limited thereto in particular.

Switches in the switch unit 108 include: a TV switch for turning ON/OFF an operation of a television (hereinafter, referred to as "TV") device; a recording reservation switch for requesting a recording reservation; a recording switch for instructing recording; a play back switch for instructing playback of a recorded program; a stop switch for instructing stoppage of playback; a communication switch for making communication via a communication network; a cursor switch for making a variety of selections; and an UP switch and a DOWN switch for use in selection of a recording program, setting of the reservation contents and the like. Every time a user operates any switch, the switch unit 108 notifies the CPU 109 of type of such an operated switch.

In recording reservation made by operating the recording reservation switch, in addition to a manual reservation for setting a channel or reservation date and time, an EPG reservation for causing the display device 105 to display a program chart based on EPG data and specifying a program on the program chart can be made. Therefore, in the program reservation apparatus according to the present embodiment, the speaker 106, the communication interface 107, and the recording memory 112 are not mandatory.

Display of the EPG data by the CPU 109 is carried out by using, for example, the work RAM 110, thereby generating EPG bit map pattern data and sending the generated data to the display device 105 via the output unit 104. Display of a screen or the like is carried out by, for example, sending a copy of an original screen stored in the program ROM 111 or a modification of the copy to the display device 105 via the output unit 104.

In the present embodiment, as shown in FIG. 16A, in manual reservation, date, start time, recording time, and channel are set by the user, respectively. Thus, these items of data are stored in the information memory 113 as reservation information obtained by manual reservation. During EPG reservation, as shown in FIG. 16B, a program ID is added to these items of data, and the added items of data are stored as reservation information. Hereinafter, in order to distinguish these items of reservation information, reservation information according to manual reservation is referred to as first reservation information, and reservation information according to EPG reservation is referred to as second reservation information, in this description.

The EPG data is transmitted as 8-day data. Thus, in order to reserve a program scheduled to be broadcast 8 days or later, manual reservation must be made. However, a broadcast schedule is occasionally or suddenly changed by virtue of a reason such as extension of another program or broadcast of a temporary special program. If such a change occurs, at least part of the reserved program cannot be recorded. Therefore, in the present embodiment, the first reservation information according to manual reservation is automatically changed (updated) to the second reservation information according to EPG reservation.

In order to achieve this correction, a program ID is added to the first reservation information, as shown in FIG. 16A. By adding this ID, even if a broadcast schedule is changed, a broadcast schedule after changed can be specified based on EPG data after changed. As a result, the reserved program can be reliably and properly recorded.

Hereinafter, an operation of a program recording apparatus which carries out reservation correction as described above will be described in detail with reference to a flow chart of each of the processes shown in FIGS. 2 to 15. Each of the processes shown in FIGS. 2 to 15 is carried out due to the CPU 109 executing a program stored in the program ROM 111.

Figure 2:
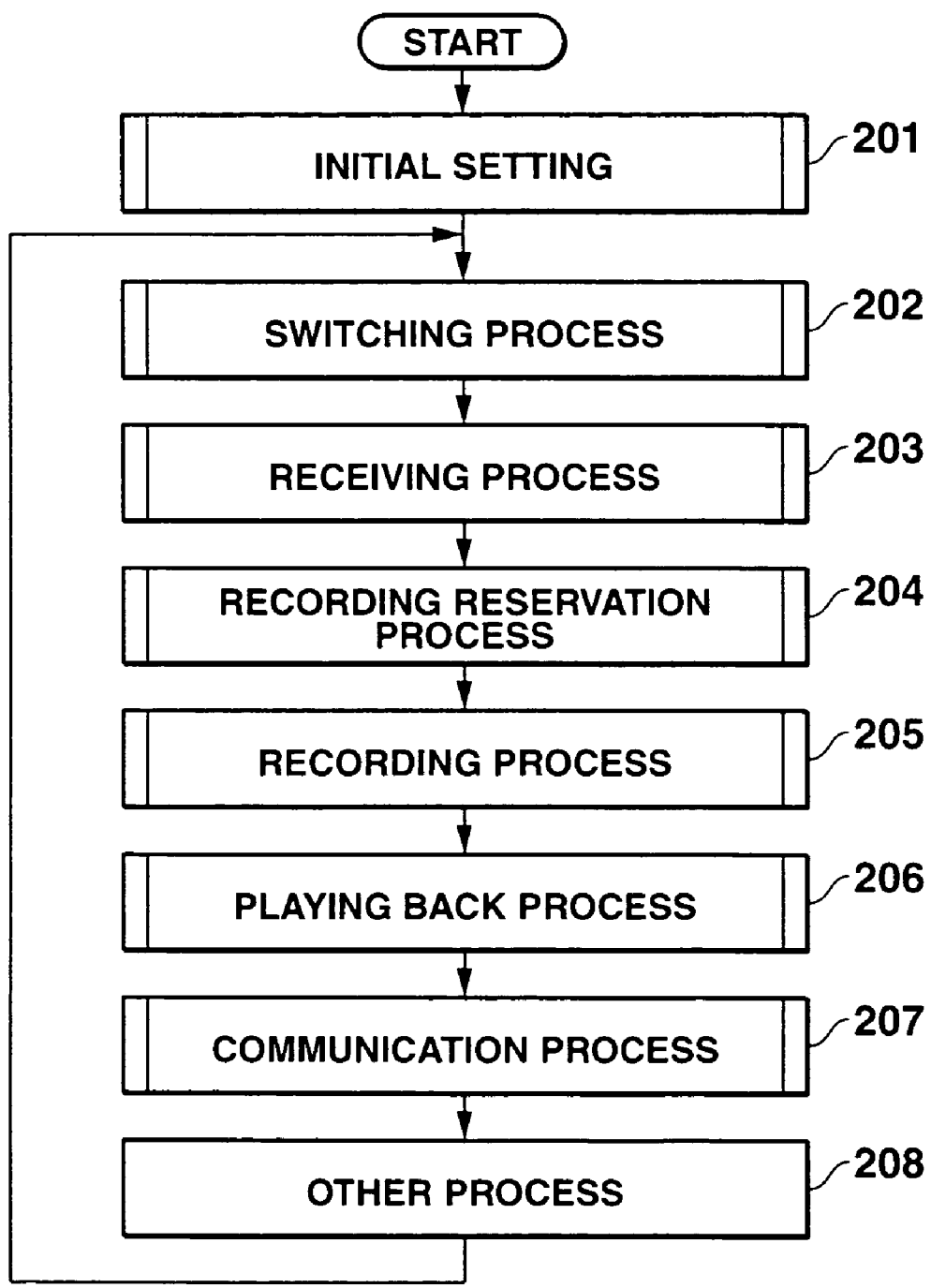
FIG. 2 is a flow chart of a general process.

FIG. 2 is a flow chart of a general process. FIG. 2 shows a whole flow of a process executed after power has been turned ON. The general process will be first described in detail with reference to FIG. 2.

In step 201, initial setting is executed after power is turned ON.

In step 202, a switch (SW) process for responding to the user operation for the switches of the switch unit 108 is executed.

In step 203, a receiving process for achieving viewing of data received by the TV unit 120 is executed.

In step 204, a recording reservation process for making a recording reservation is executed.

Then, a recording process (step 205) for carrying out program recording; a playing back process (step 206) for playing back a recorded program; a communication process (step 207) for making communication via a communication network; and another processing (step 208) are executed in ascending order, and then, processing returns to step 202.

Subroutine processes executed in the above general process is specifically given below. Referring to FIGS. 3 to 14, each of the subroutine processes will be described in detail. A setting process of the subroutine processes will be first described in detail with reference to FIG. 3.

Figure 3:
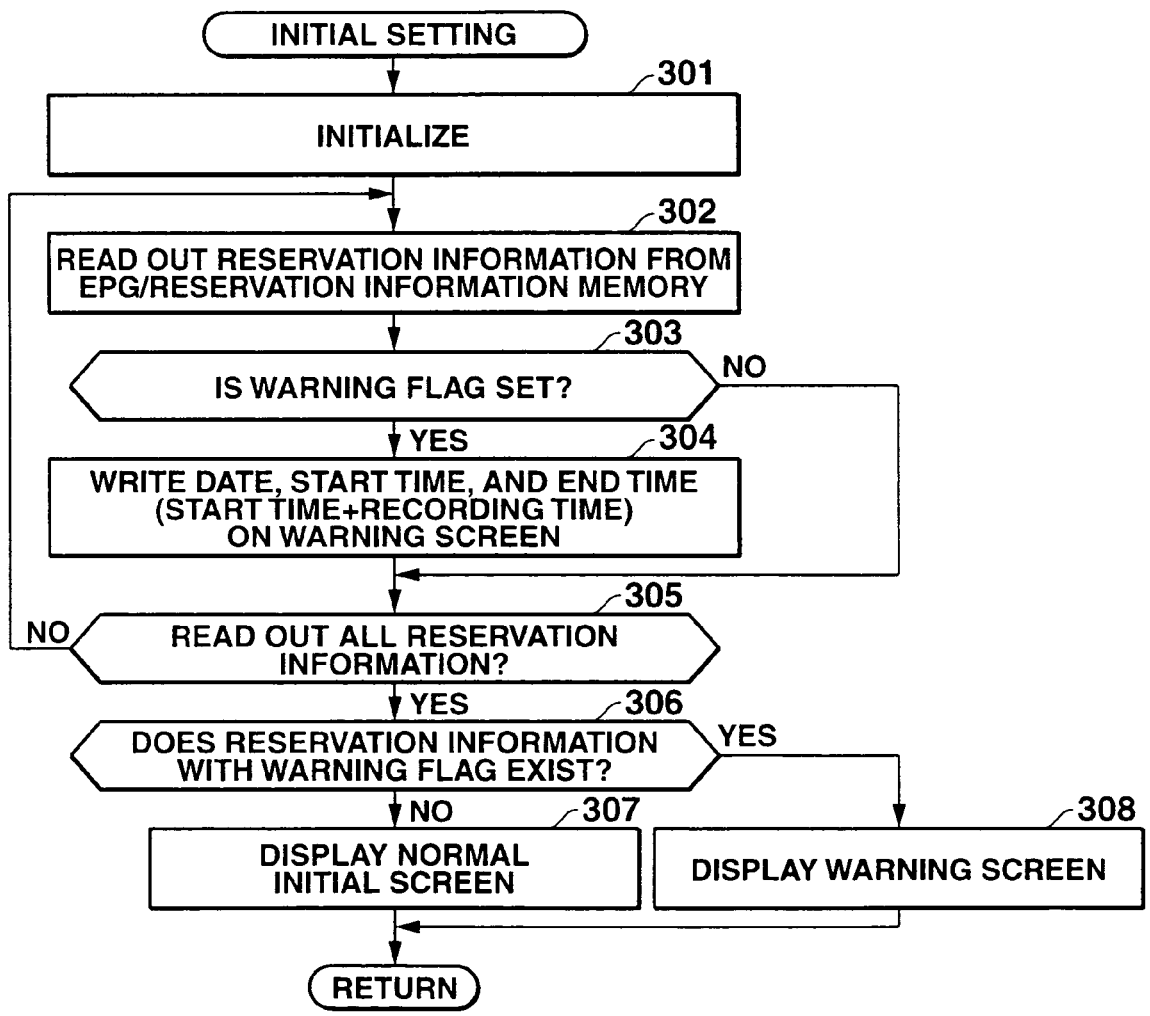
FIG. 3 is a flow chart of an initial setting process.

FIG. 3 is a flow chart of the initial setting process executed at step 201.

The first reservation information is changed to the second reservation information by extracting a program which corresponds to the first reservation information on EPG data. However, when the reservation date and time has been mistakenly set or when a broadcast schedule is changed after the reservation date and time has been set, i.e., the EPG data acquired after reservation has been obtained after changing a broadcast schedule, the corresponding program cannot be properly extracted. If that program cannot be properly extracted, change to the second reservation information cannot be properly carried out as well. Therefore, in the embodiment, a warning flag is added to the first reservation information, such as shown in FIG. 16A, and a warning flag is set if the corresponding program cannot be properly extracted (for example, the set value is set to "1"). In this manner, the fact is notified to the user so as to cause the user oneself to take adequate measure.

In step 301, initialization is carried out.

In step 302, one item of first reservation information is read out from the information memory 113.

In step 303, it is determined whether or not a warning flag of that reservation information has been set. When the warning flag is set, YES is determined. In step 304, the reserved data, channel number, start time, and end time (start time+ recording time) are displayed on the warning screen as shown in FIG. 18 for notifying the fact that the reservation contents do not match EPG, and then, processing goes to step 305. Otherwise, NO is determined, and processing directly goes to step 305.

In step 305, it is determined whether or not all items of the first reservation information stored in the information memory 113 have been read out. When all items of the first information have been read out, YES is determined, and processing goes to step 306. Otherwise, NO is determined, processing returns to the above step 302. In this manner, remaining items of the first reservation information are read out from the information memory 113.

In step 306, it is determined whether or not there is first reservation information to which a warning flag has been set. When there does not exist the first reservation information to which the flag has been set, NO is determined. Then, the display device 105 is caused to display a normal initial screen in step 307, and a series of processes is terminated. Otherwise, YES is determined. Then, in step 308, the display device 105 is caused to display the warning screen as shown in FIG. 18, and a series of processes is terminated.

In this manner, in the embodiment, a program reservation (first reservation information) having faulty reservation contents is notified to the user when the power is turned ON. This assists the user to enable reliable recording of a desired program.

Figure 4:
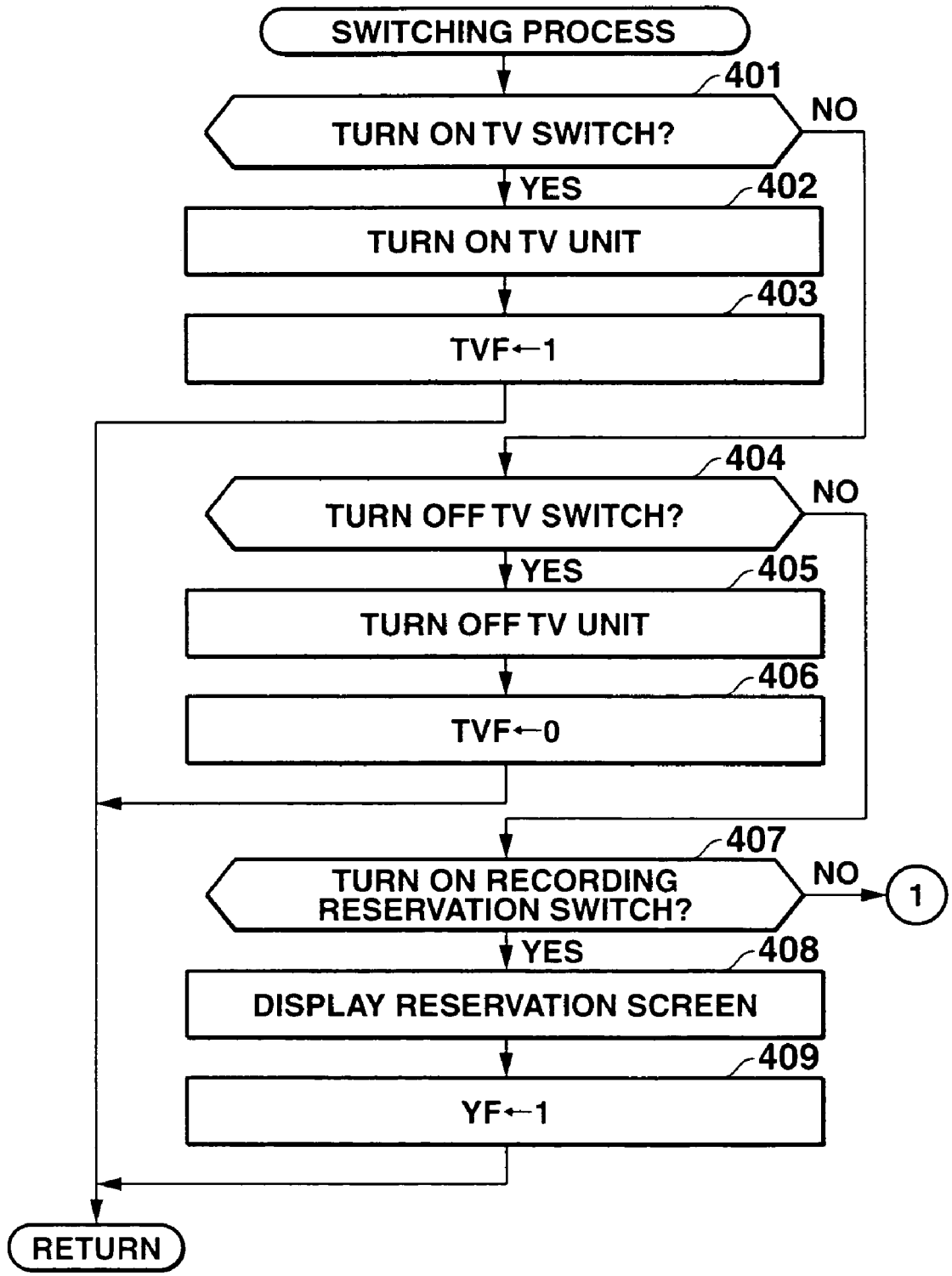
FIG. 4 is a flow chart of a switching process.
Figure 5:
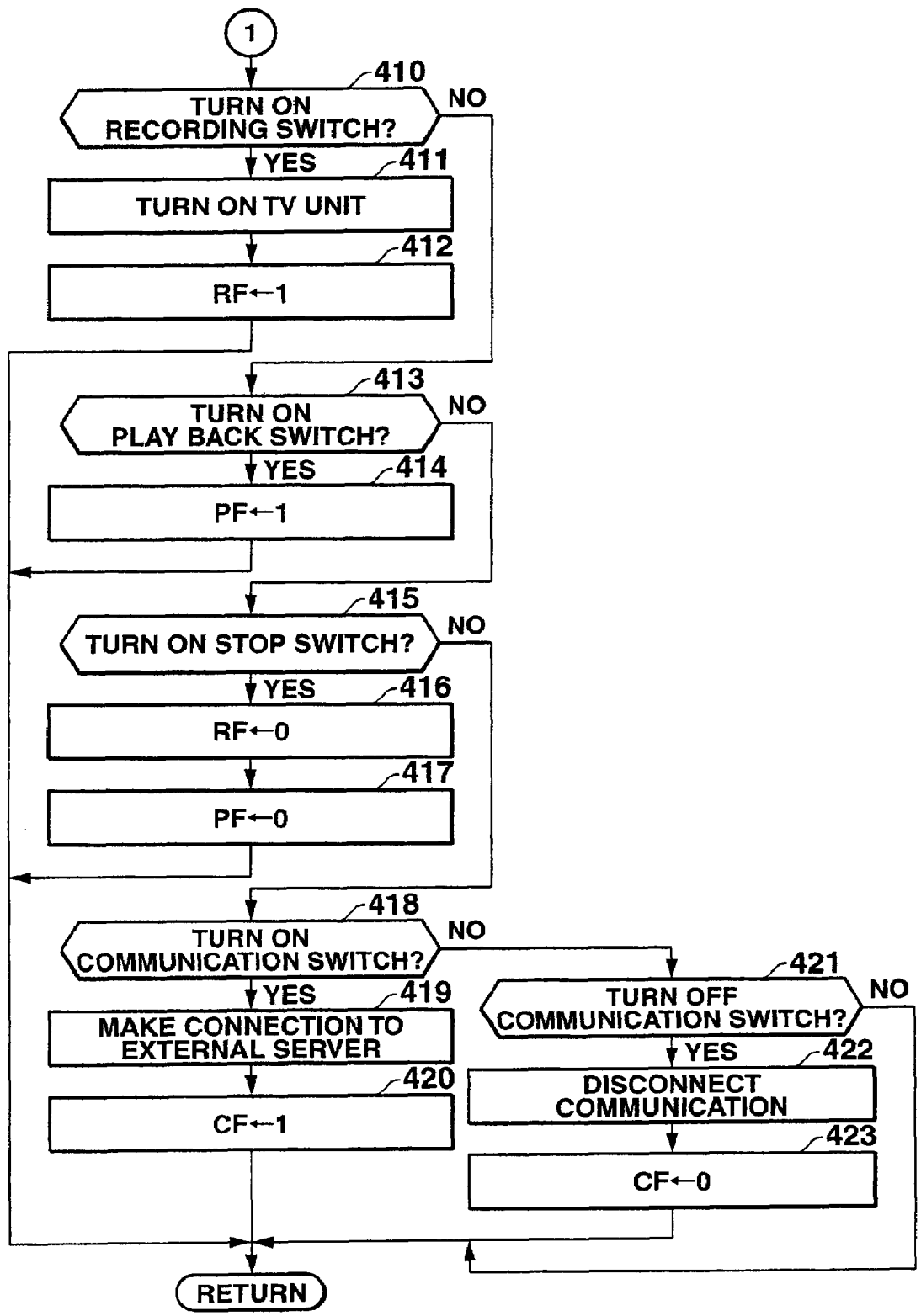
FIG. 5 is a flow chart of a switching process (continued)

FIGS. 4 and 5 each are a flow chart of the switching process executed as step 202 in the general process shown in FIG. 2. Now, the switching process will be described in detail with reference to FIGS. 4 and 5.

In step 401, it is determined whether or not the TV switch has been turned ON. The state of the TV switch is changed every time it is operated, for example. Namely, the TV switch is changed from an ON state to an OFF state or vice versa. Therefore, when the user has operated the TV switch, thereby changing a current state to the ON state, the ON state is notified from the switch unit 108 to the CPU 109. Thus, YES is determined, and in step 402, the TV unit 120 is turned ON, that is, each of the units 101 to 103 configuring the TV unit 120 is turned ON. Further, in step 403, "1" is substituted for a variable TVF for managing the ON/OFF state of the TV unit 120 as a value indicating that power is turned ON, and then, a series of processes is terminated. Otherwise, NO is determined, and processing goes to step 404.

In step 404, it is determined whether or not the TV switch has been turned OFF. When the user has operated the TV switch, thereby changing a current state to an OFF state, YES is determined. In step 405, the TV unit 120 is turned OFF. Further, in step 406, "0" is substituted for a variable TVF as a value indicating that power is turned OFF, and then, a series of processes is terminated. Otherwise, NO is determined, and processing goes to step 407.

In step 407, it is determined whether or not the recording reservation switch has been turned ON. When the user has operated the switch, YES is determined. Then, in step 408, the display device 105 is caused to display a reservation screen for making a reservation. Further, in step 409, "1" is substituted for a variable YF for managing a reservation enable state as a value indicating that a reservation enable state is set, and then, a series of processes is terminated. Otherwise, NO is determined, and processing goes to step 410 of FIG. 5.

In step 410, it is determined whether or not the recording switch has been turned ON. When the user has operated the switch, YES is determined, and in step 411, the TV unit 120 is turned ON. Further, in step 412, "1" is substituted for a variable RF for managing recording as a value indicating that recording is in progress, and then, a series of processes is terminated. Otherwise, NO is determined, and processing goes to step 413.

In step 413, it is determined whether or not the playback switch has been turned ON. When the user has turned the switch, YES is determined. In step 414, "1" is substituted for a variable PF for managing playback as a value indicating that playback is in progress, and then, a series of processes is terminated. Otherwise, NO is determined, and processing goes to step 415.

In step 415, it is determined whether or not the stop switch has been turned ON. When the user has operated the switch, YES is determined. In step 416, "0" is substituted for a variable RF as a value indicating that recording is not in progress. Further, in step 417, "0" is substituted for a variable PF as a value indicating that playback is not in progress, and then, a series of processes is terminated. Otherwise, NO is determined, and processing goes to step 418.

In step 418, it is determined whether or not the communication switch has been turned ON. The state of the communication switch is changed every time it is operated, as in the TV switch. In the embodiment, the communication switch is provided so that the user can instructs EPG data to be acquired from a preset server. Therefore, when the user has operated the switch, YES is determined. In step 419, connection with the server is made. Further, in step 420, "1" is substituted for a variable CF for maintaining communication as a value indicating that communication is in progress, and then, a series of processes is terminated. Otherwise, NO is determined, and processing goes to step 421. Connection with the server is achieved due to the CPU 109 sending information for such connection to the communication interface 107, and instructing connection therewith.

In step 421, it is determined whether or not the communication switch has been turned OFF. When the user has operated the switch, thereby changing a current state to the OFF state, YES is determined. In step 422, a process for disconnecting communication is carried out. Further, in step 423, "0" is substituted for a variable CF as a value indicating that communication is not in progress, and then, a series of processes is terminated. Otherwise, NO is determined, and a series of processes is terminated.

Figure 6:
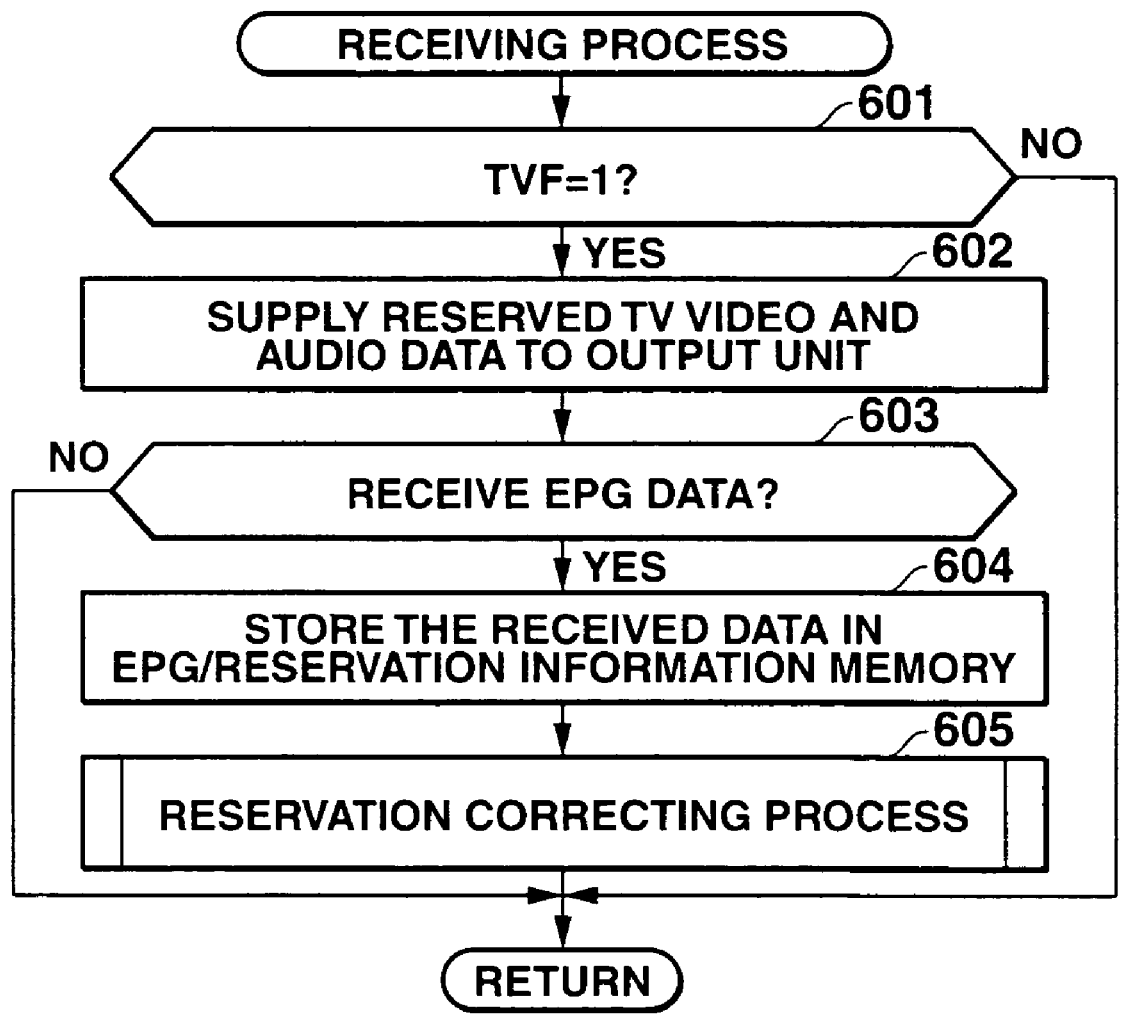
FIG. 6 is a flow chart of a receiving process.

Now, the receiving process executed as step 203 in the general process shown in FIG. 2 will be described in detail with reference to the flow chart shown in FIG. 6.

In step 601, it is determined whether or not a value of a variable TVF is set to "1". When the TV unit 120 is turned ON, "1" is substituted for that variable. Thus, YES is determined, and processing goes to step 602 in which a process for supplying decoded video data and audio data of a program output from the decoder 102 to the output unit 104 is carried out. By that process, the display device 105 is caused to display a program video, and the speaker 106 generates the associated voice. Otherwise, the TV unit 120 is not turned ON, NO is determined, and a series of processes is terminated.

In step 603, it is determined whether or not the TV unit 120 has received EPG data. For example, the demodulator 102 notifies the CPU 109 of receipt of the EPG data. Therefore, when the notification has been made, YES is determined. In step 604, the EPG data is stored in the information memory 113 in an overwritten manner. Further, a reservation correction process for correcting the reservation information stored in the memory 113 according to the EPG data is executed in step 605 and a series of processes is terminated. Otherwise, NO is determined, and a series of processes is terminated.

Now a reservation correcting process executed in step 605 will be described in detail with reference to the flow charts shown in FIGS. 7 to 9. There is a possibility that a broadcast schedule has been changed during a period of time after previous EPG data has been acquired and until current EPG data is acquired. It is impossible to know in advance which part of a broadcast schedule has been changed. Therefore, in the embodiment, the reservation information stored in the information memory 113 is corrected as required every time EPG data is acquired. With respect to the first reservation information, during the reservation, a change is made by adding an ID of a reserved program and changing the first reservation information to the second reservation information.

Figure 7:
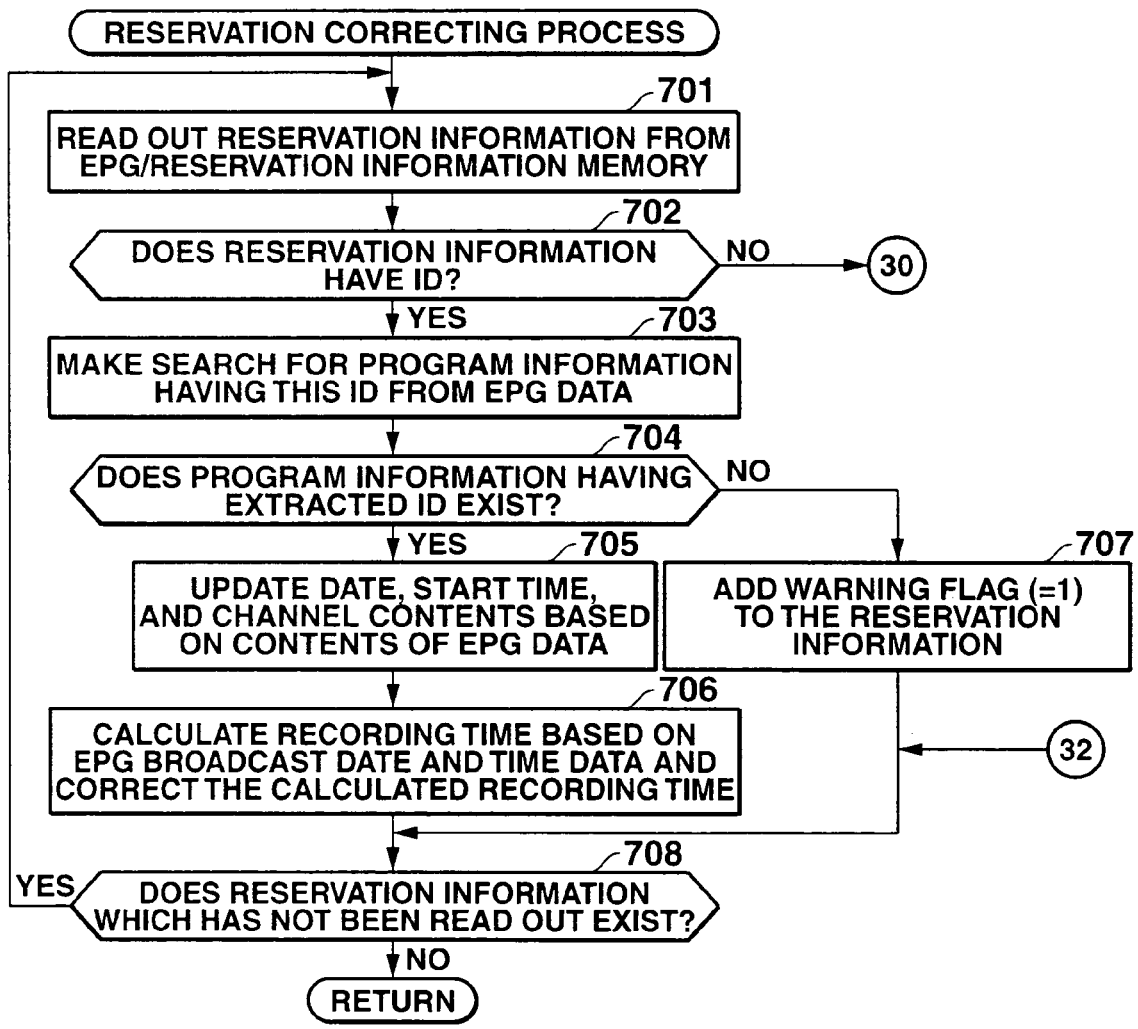
FIG. 7 is a flow chart of a reservation correcting process.

After the EPG data stored in the information memory 113 is read out, one item of the reservation information is read out in step 701 of FIG. 7.

Figure 8:
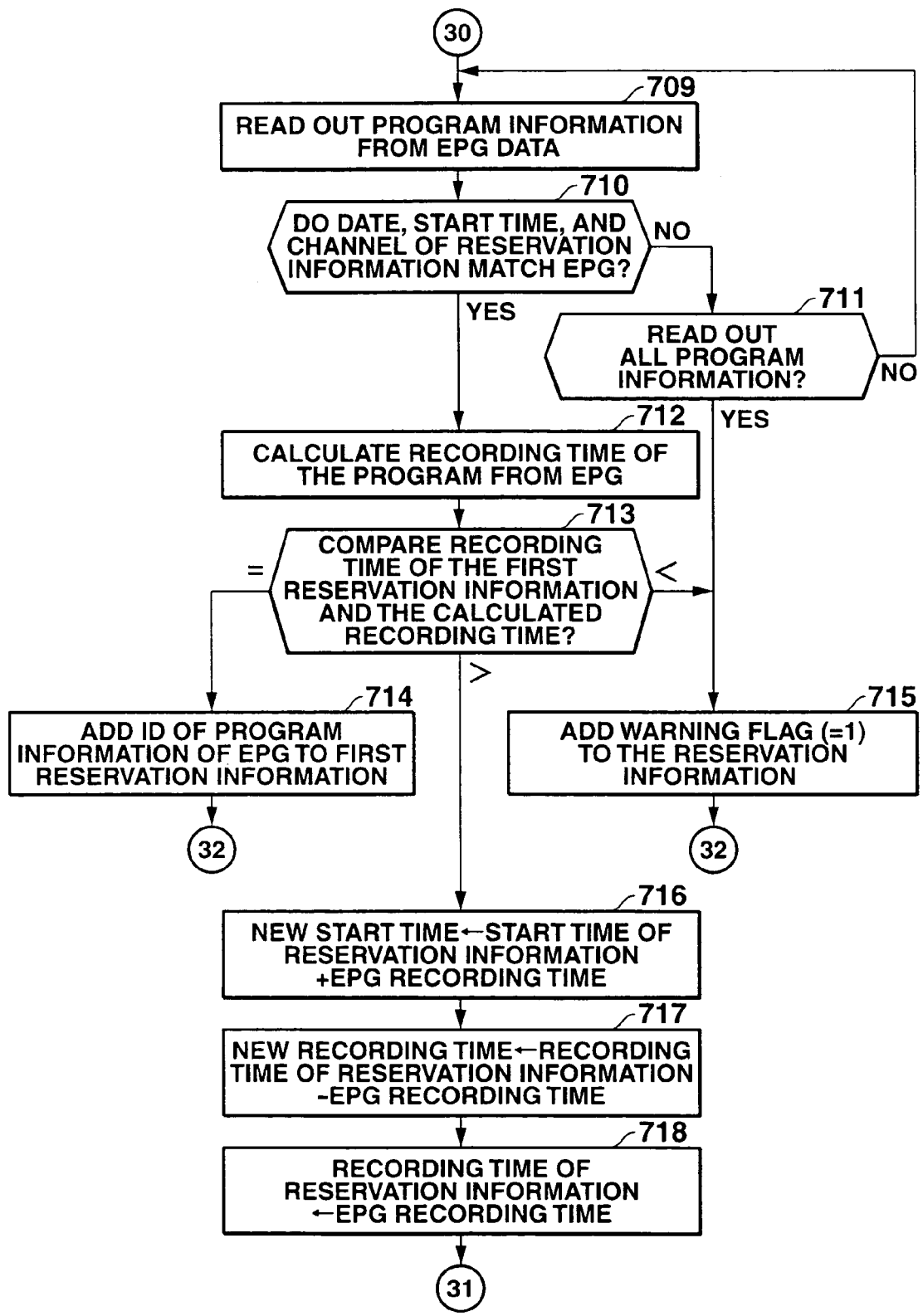
FIG. 8 is a flow chart of a reservation correcting process (continued)

In step 702, it is determined whether or not the read-out reservation information has an ID. when the reservation information does not have an ID, i.e., when the read-out information is the first reservation information, NO is determined, and processing goes to step 709 of FIG. 8. Otherwise, YES is determined, and processing goes to step 703.

In step 703, a search is made for extracting program information having that ID from EPG data.

In step 704, it is determined whether or not program information having that ID is extracted from the EPG data. When the program information has been existed, YES is determined. If any change occurs with the date, start time, and channel number contained in the second reservation information, such a change is corrected in accordance with the EPG data (step 705). Further, a recording time is calculated based on the broadcast date and time of the program information. If the recording time contained in the reservation information does not match the calculated recording time, the recording time contained in the reservation information is updated to the calculated recording time. The updated information is stored in the information memory 113 in an overwritten manner (step 706), and processing goes to step 708. Otherwise, i.e., when there does not exists program information having an ID contained in the second reservation information, NO is determined in step 704. Then, the program reserved to be recorded is not assumed to be broadcast. In step 707, a warning flag contained in the second reservation information is set, and the associated information is stored in the information memory 113 in an overwritten manner, and then, processing goes to step 708.

In step 708, it is determined whether or not there exists reservation information which has not been read out from the information memory 113. When such reservation information exists, YES is determined, and processing returns to the above step 701 in which readout of another item of the reservation information is carried out. Otherwise, NO is determined, and a series of processes is terminated.

In step 709 of FIG. 8 to which processing goes after NO has been determined in step 702, one item of the program information is extracted from the EPG data.

In step 710, it is determined whether or not all the date, start time, and channel number of the first reservation information match the extracted program information. When all of them have matched the extracted information, YES is determined, and processing goes to step 712. Otherwise, NO is determined, and processing goes to step 711.

In step 711, it is determined whether or not all items of the program information have been extracted from the EPG data. When all items of the program information have been extracted, i.e., when it is found that program information corresponding to the first reservation information does not exist in the EPG data, YES is determined. In step 715, after a warning flag contained in the first reservation information is set, processing goes to step 708 of FIG. 7. Otherwise, NO is determined, and processing returns to the above step 709 in which extracting of another item of the program information is carried out.

By setting the warning flag in this manner, when power is turned ON, the fact that the first reservation information to which the warning flag has been set does not properly reserve a program scheduled to be broadcast is notified to the user. In this manner, the user can reliably change a program reservation whose contents are not intended to be reserved to a program reservation whose contents are intended to be reserved. Therefore, the user is assisted so as to make a proper program reservation of the reservation contents.

In step 712, on the other hand, a program recording time is calculated from the broadcast date and time of program information.

In step 713, a recording time of the first reservation information and the calculated recording time are compared. When these time intervals match each other, processing goes to step 714 in which an ID of program information of the EPG is added to the first reservation information so as to cope with the change of the broadcast schedule, and the added information is stored in the information memory 113. Then, processing goes to step 708 of FIG. 7. By adding the ID, a change of the broadcast schedule can be corrected.

When the calculated recording time is longer than the recording time of the first reservation information, processing goes to step 715. When the calculated recording time is shorter than the recording time of the first reservation information, processing goes to step 716.

When a plurality of continuous programs are reserved, the calculated recording time becomes shorter. This is because that the reservation is usually made by a unit of hour even though an actual program does not broadcast for an hour. Thus, there is a possibility that the first reservation information corresponds to a plurality of reserved continuous programs. However, EPG based reservation must be made on a program by program basis. Therefore, in steps 716 to 718 of FIG. 8 and in steps 719 to 721 of FIG. 9, as shown in FIG. 17, a process for dividing the first reservation information into the second reservation information for each program is carried out. An example shown in FIG. 17 shows a case in which two programs are scheduled to be broadcast in a time interval from 19:00 to 20:54 in which source reservation information (first reservation information) is reserved to be recorded. In this manner, in the figure, the first reservation information is divided into two items of reservation information expressed as "reservation information on program 1" and "reservation information on program 2". Here, a description will be given by way of example of dividing source reservation information into two items of reservation information. In actuality, many more programs may be scheduled to be broadcast. However, even in that case, the dividing method is basically identical. In the present embodiment, one of the two items of the second reservation information is generated in a form such that the first reservation information is updated, and the other is newly generated.

In step 716, a time after a recording time of the program information has elapsed from a start time of the first reservation information is set as a start time for newly generated second reservation information (expressed as "new start time" in the figure).

In step 717, a time which is shorter by a recording time of the program information from the recording time of the first reservation information is set as a recording time of the second reservation information (expressed as "new recording time" in the figure).

In step 718, the recording time of the first reservation information is updated to the recording time of the first program information. Then, processing goes to step 719 of FIG. 9.

In step 719, an ID of the program information is added to the first reservation information, and the added information is stored in the information memory 113 in an overwritten manner.

In step 720, second reservation information is generated, the information having the same channel number as the first reservation information; the start time and recording time set in steps 716 and 717, respectively; and an ID of program information of a program scheduled to be broadcast from the start time.

In step 721, the generated second reservation information is stored in the information memory 113. Then, processing goes to step 708 of FIG. 7.

In this manner, the first reservation information including a plurality of reserved programs is divided into second reservation information for each program. Therefore, a change of each of the broadcast schedules of programs can be corrected. Accordingly, each program can be reliably recorded.

Figure 10:
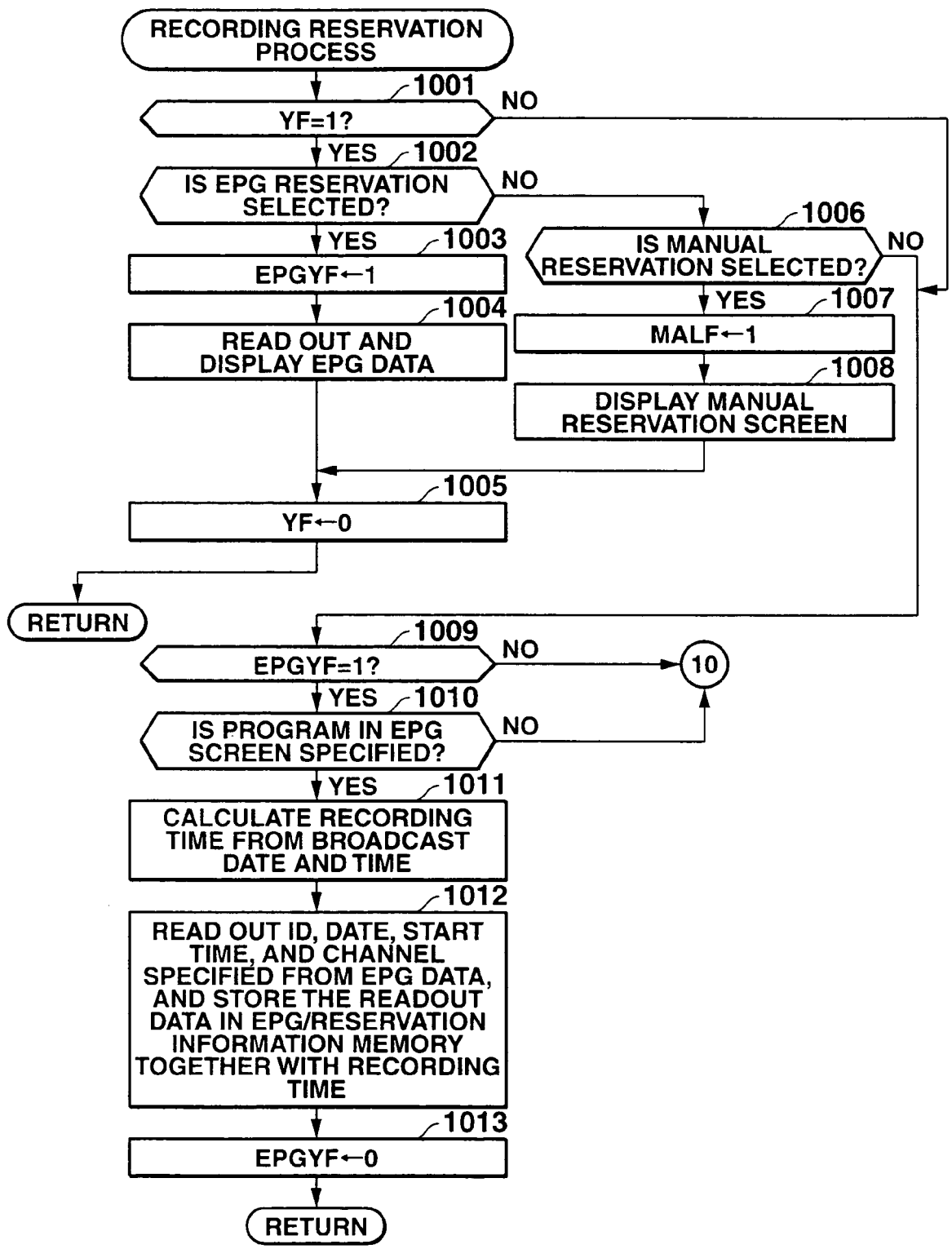
FIG. 10 is a flow chart of a recording reservation process.
Figure 11:
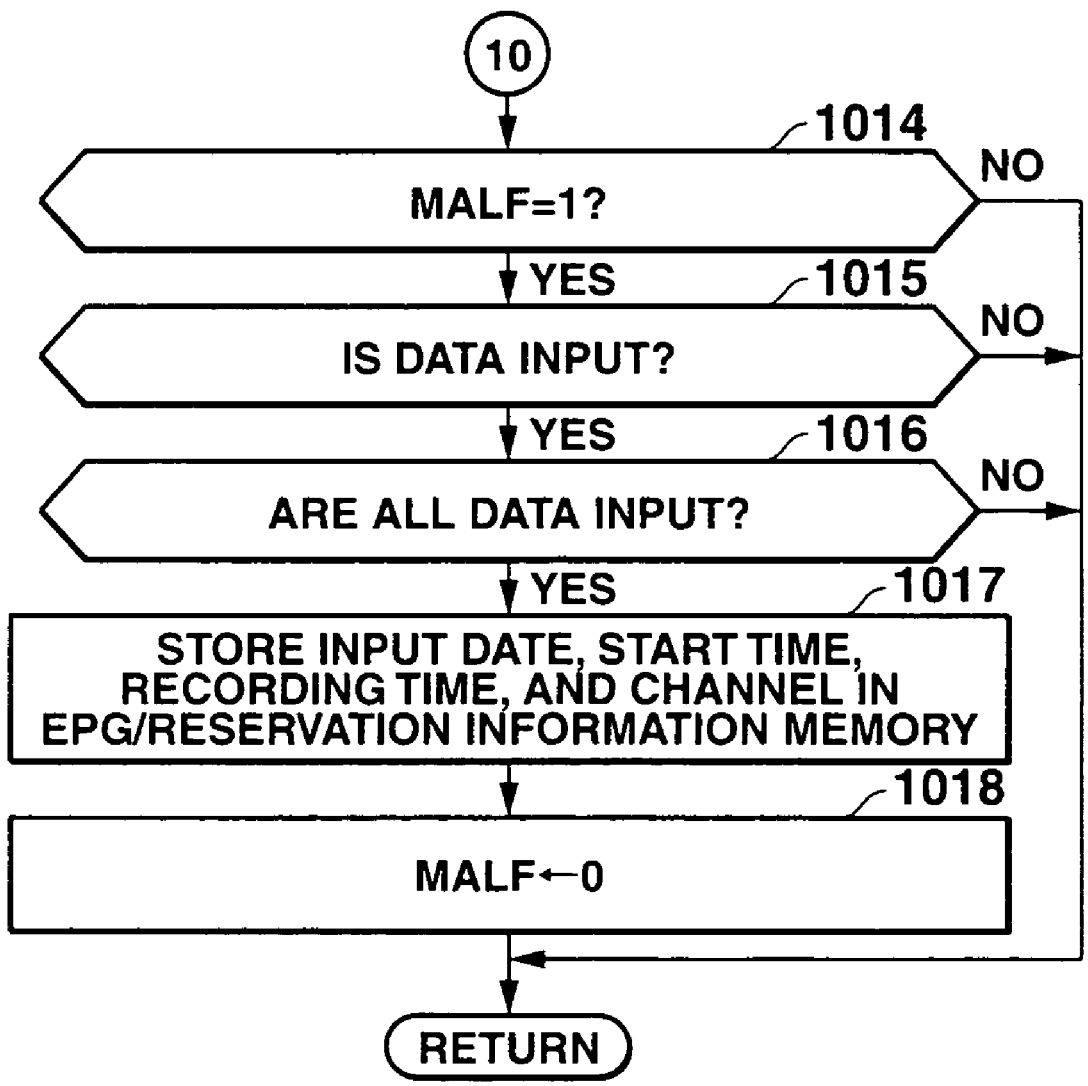
FIG. 11 is a flow chart of a recording reservation process (continued)

Now, a subroutine process executed in the general processes shown in FIG. 2 will be described again. FIGS. 10 and 11 each are flow charts of the recording reservation process executed as step 204. The reservation process will be described in detail with reference to FIGS. 10 and 11.

In step 1001, it is determined whether or not a value of a variable YF is set to "1". When a recording reservation enable state has been set, "1" is substituted for the variable YF. Thus, YES is determined, and processing goes to step 1002. Otherwise, NO is determined, and processing goes to step 1009.

In step 1002, it is determined whether or not EPG reservation has been selected. When the user has made an operation of selecting the EPG reservation, YES is determined. Then, "1" is substituted for a variable EPGYF as a value indicating that the EPG reservation enable state is set (step 1003), and EPG data is read out from the information memory 113 and the display device 105 is caused to display the read out data (step 1004). Further, "0" is substituted for the variable YF (step 1005), and a series of processes is terminated. Otherwise, NO is determined, and processing goes to step 1006.

In step 1006, it is determined whether or not a manual reservation has been selected. When the user made an operation of selecting such a manual reservation, YES is determined. Then, "1" is substituted for a variable MALF as a value indicating that the manual reservation enable state is set (step 1007). Then, the display device 105 is caused to display a manual reservation screen for such a reservation (step 1008), and processing goes to the above step 1005. Otherwise, NO is determined, and processing goes to step 1009.

In step 1009, it is determined whether or not the value of the variable EPGYF is set to "1". When the user has selected the EPG reservation, "1" is entered for the variable. Thus, YES is determined, and processing goes to step 1010. Otherwise, NO is determined, and processing goes to step 1014 of FIG. 11.

In step 1010, it is determined whether or not the user has specified a program from among the displayed EPG data (program chart). When the user has made an operation for that purpose, YES is determined, and a recording time is calculated from the broadcast date and time of the program information on that program. Then, the date, start time, ID, and channel number are acquired from the EPG data and the program information. The acquired items of information and the calculated recording time are stored in the information memory 113 as the second reservation information. Further, "0" is substituted for the variable EPGYF (steps 1011 to 1013), and a series of processes is terminated. On the other hand, when the user has not made such an operation, NO is determined, and processing goes to step 1014 of FIG. 11.

In step 1014, it is determined whether or not the value of the variable MALF is set to "1". When "1" has been substituted for the variable MALF, YES is determined, and processing goes to step 1015. Otherwise, NO is determined, and a series of processes is terminated.

In step 1015, it is determined whether or not data input has been made. When the user has not made an operation for data input to the switch unit 108, NO is determined, and a series of processes is terminated. Otherwise, YES is determined, and processing goes to step 1016 in which it is determined whether or not all the data necessary for recording reservation have been input. When all the data have been input, YES is determined. Then, the, input date, start time, recording time, and channel number are stored in the information memory 113 as the first reservation information. After storing them, "0" is substituted for the variable MALF (steps 1017 and 1018), and a series of processes is terminated.

In this manner, the user's data input date, start time, recording time, and channel number are stored in the information memory 113 as the first reservation information. The first reservation information is automatically updated to the second reservation information, whereby the user can reliably made desired program recording by reservation. When it is found that a program corresponding to the reservation contents is not a scheduled to be broadcast, the fact is automatically notified so that the user can change undesired reservation contents to desired reservation contents.

Figure 12:
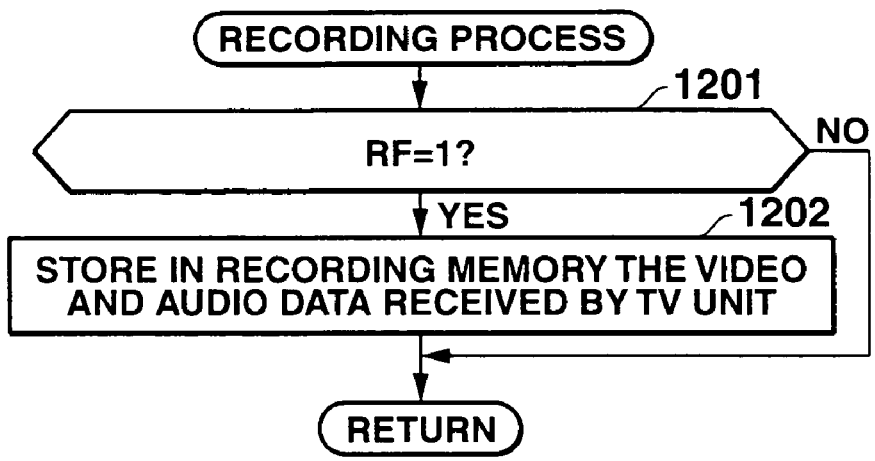
FIG. 12 is a flow chart of a recording process.

FIG. 12 is a flow chart of a recording process executed as step 204 in the general processes shown in FIG. 2. In this recording process, first, in step 1201, it is determined whether or not the value of the variable RF is set to "1". When the value is set to "1", namely, indicates that recording is in progress, YES is determined, and processing goes to step 1202 in which the recording memory 113 is caused to store items of data such as video data and audio data after decoded by the decoder 103, and then, a series of processes is terminated. Otherwise, NO is determined, and a series of processes is terminated.

Figure 13:
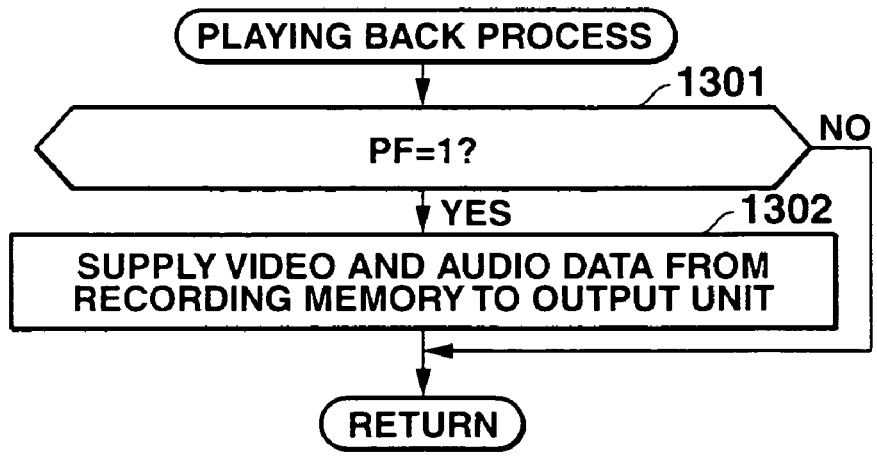
FIG. 13 is a flow chart of a playing back process.

FIG. 13 is a flow chart of a playing back process executed as step 205 in the general processes shown in FIG. 2. In this playing back process, first, in step 1301, it is determined whether or not the value of the variable PF is set to "1". When the value is set to "1", namely, indicates that playback is in progress, YES is determined, and processing goes to step 1302 in which items of data such as video and audio are read out from the recording memory 113, the read out data is supplied to the output unit 104, and then, a series of processes is terminated. Otherwise, NO is determined, and a series of processes is terminated.

Figure 14:
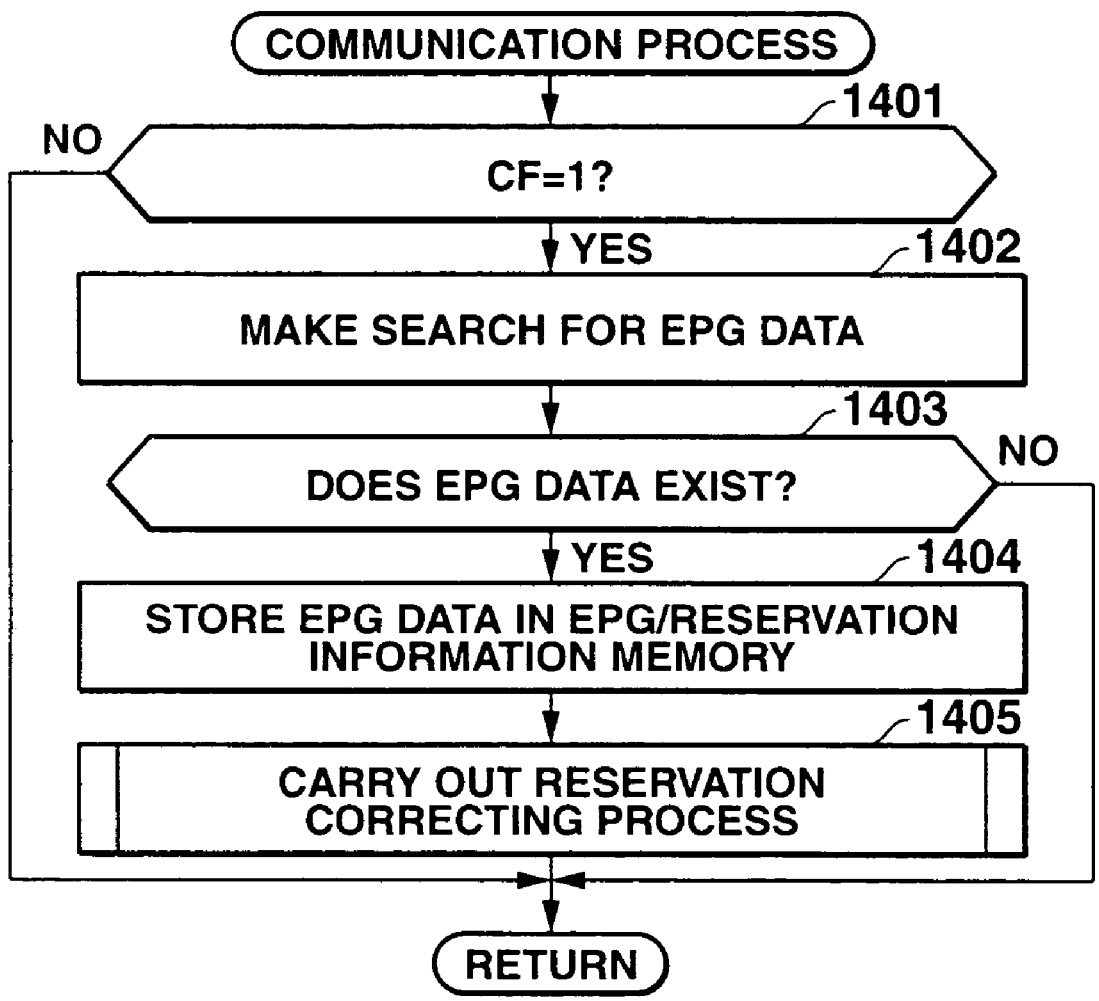
FIG. 14 is a flow chart of a communication process.

FIG. 14 is a flow chart of a communication process executed as step 207 in the general processes shown in FIG. 2. This communication process is executed in order to acquire EPG data from the server connected by executing the process in step 419 of FIG. 5. A last subroutine process, i.e., a communication process executed in the general processes shown in FIG. 2 will be described in detail with reference to FIG. 14.

In step 1401, it is determined whether or not the value of the variable CF is set to "1". When the value is set to "1", namely, indicates that server connection has been made, YES is determined, and processing goes to step 1402. Otherwise, NO is determined, and a series of processes is terminated.

In step 1402, a search is made for EPG data which should be downloaded from the server. In the following step 1403, it is determined whether or not the existence of the target EPG data has been successfully identified by such a search. When such EPG data exists, YES is determined. In step 1404, the EPG data is downloaded by the communication interface 107, and the information memory 113 is caused to store the downloaded data. In the next step 1405, the reservation correcting process shown in FIGS. 7 to 9 is executed, and a series of processes is terminated. Otherwise, NO is determined, and a series of processes is terminated.

Figure 15:
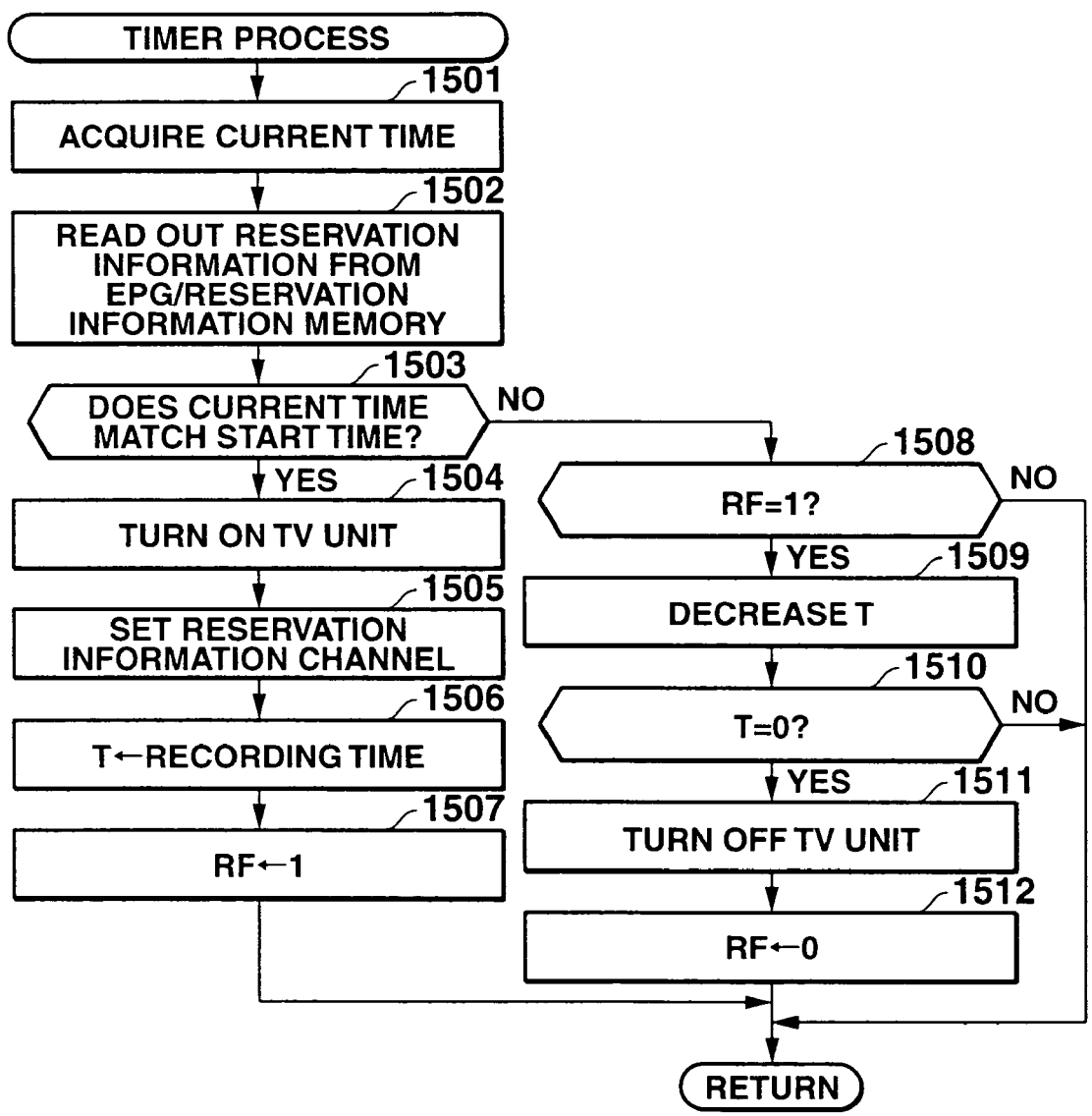
FIG. 15 is a flow chart of a timer process.

FIG. 15 is a flow chart of a timer process. The timer process is intended to carry out recording at a reserved date and time. For example, when power is not turned ON, the power is started up by an interrupt signal generated at a predetermined time interval. Lastly, the timer process will be described in detail with reference to FIG. 15.

In step 1501, for example, a current time is acquired from a part timer incorporated in the CPU 109.

In step 1502, readout of reservation information is carried out from the information memory 113.

In step 1503, it is determined whether or not a start time from among the read-out reservation information matches the current time. When such reservation information is not stored in the information memory 113, NO is determined, and processing goes to step 1508. Otherwise, YES is determined; the TV unit 120 is turned ON (step 1504), and the channel of a channel number of reservation information is set as a receiving channel (step 1505). Then, a value indicating a recording time of reservation information is substituted for a variable T (step 1506). Further, "1" is substituted for a variable RF (step 1507), and a series of processes is terminated.

In step 1508, it is determined whether or not the value of the variable RF is set to "1". When the value is set to "1", namely, indicates that recording due to reservation is in progress, YES is determined. Then, in step 1509, a value corresponding to an interrupt period is subtracted from the value of the variable T, and then, processing goes to step 1510. Otherwise, NO is determined, and a series of processes is terminated.

In step 1510, it is determined whether or not the value of the variable T is set to "0". When recording of a recording time has completed, the value of the variable T is set to "0", and thus, YES is determined. In step 1511, the TV unit 120 is turned OFF; "0" is substituted for a variable RF in the next step; and a series of processes is terminated. Otherwise, NO is determined, and a series of processes is terminated.

In a state in which power is turned OFF, the recording process shown in FIG. 12 is also executed as an interrupt process. In this manner, recording of the user reserved program is carried out under a condition that power is turned OFF.

In the present embodiment, although a program reservation is made for purpose of reserving program recording, this program reservation may be made for the purpose of viewing a program. With respect to acquisition of EPG data, acquisition of the data recorded in a recording medium may be enabled.

A program reservation is occasionally made so as to avoid recording of an unnecessary portion in the broadcast date and time of a program. For example, there is a case in which an opening portion or a commercial portion is cut. Therefore, it is desirable that an allowable range be provided to determine program information which corresponds to the first reservation information. On the other hand, there is a case in which such opening or commercial portion is not cut. Therefore, the reservation contents may be changed in a form such that they are adapted to program information. In this manner, when the user has made a reservation based on mistaken contents, a desired program can be recorded regardless of such a mistake.

Figure 9:
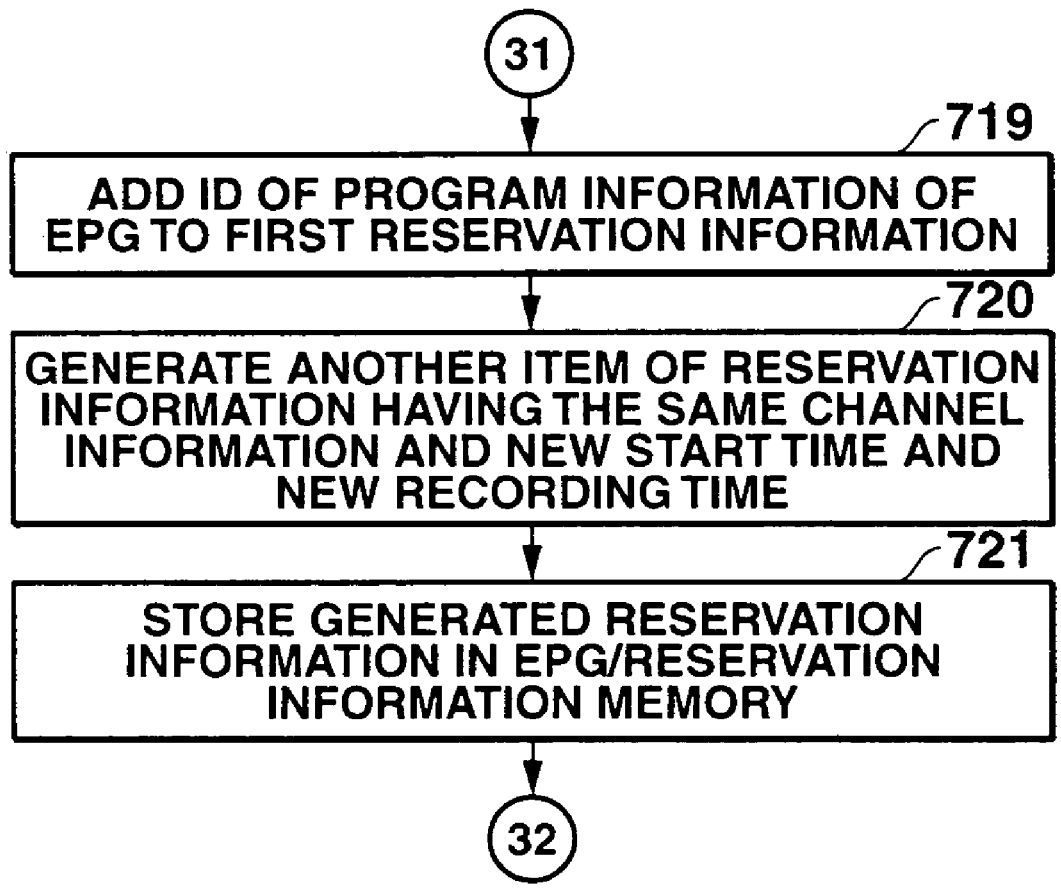
FIG. 9 is a flow chart of a reservation correcting process (continued)
Figure 19:
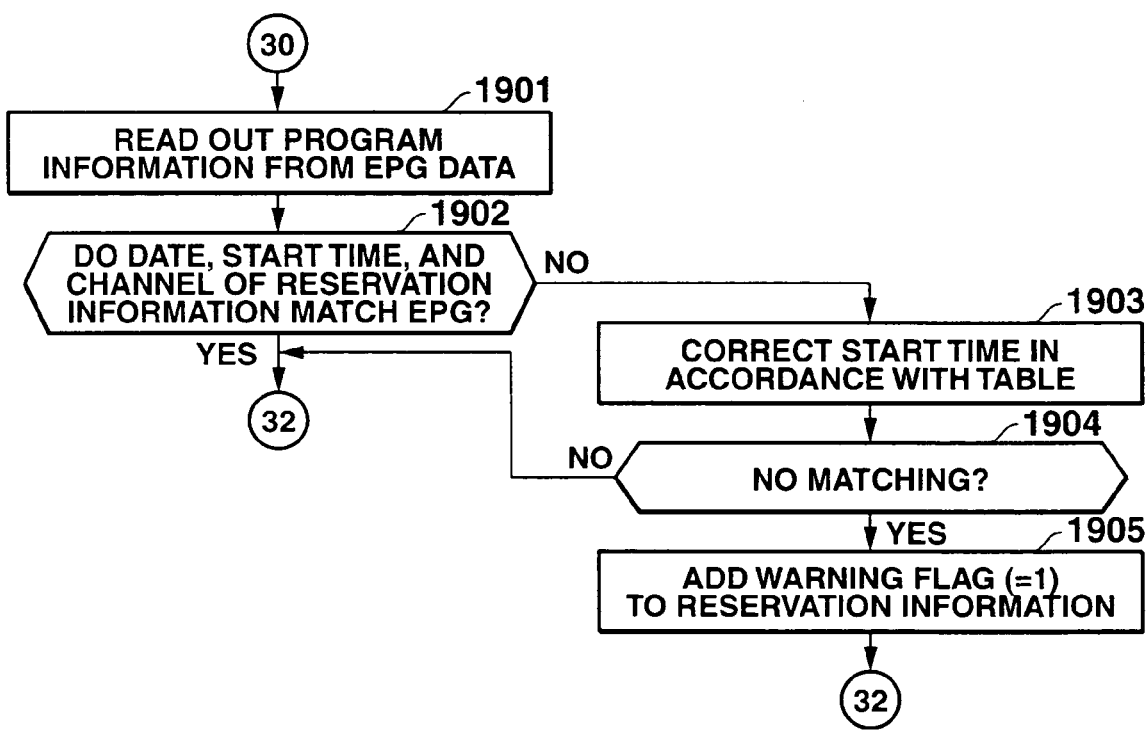
FIG. 19 is a flow chart of a reservation correcting process in another embodiment.

A change of the reservation contents can be achieved by changing the flow charts in steps 709 and subsequent of FIG. 8 to the flow chart of FIG. 19 in the reservation correcting process shown in FIGS. 7 to 9, for example.

In the flow chart shown in FIG. 19, when No is determined in step 702 of FIG. 7, processing goes to step 1901 in which program information whose contents are the closest to those of the first reservation information is extracted from EPG data.

In step 1902, it is determined whether or not all of the date, start time, and channel number of the first reservation information match the extracted program information. When all of them match the extracted information, YES is determined, and processing goes to step 708 of FIG. 7. Otherwise, NO is determined, and processing goes to step 1903.

In step 1903, with reference to a table defining a method for correcting a start time, if any correcting method defined by the table can be applied, the start time of the first reservation information is corrected. In the correcting method, an allowable range of the start time which should be regarded to have matched program information, for example, is defined on a pattern by pattern basis of the broadcast date and time of a program.

In step 1904, it is determined whether or not any table correcting method matches the current case. When an applicable correcting method does not exist, YES is determined. In step 1905, a warning flag contained in the first reservation information is set, and processing goes to step 708 of FIG. 7. Otherwise, NO is determined, and processing goes to step 708.

The first reservation information whose contents do not match those of the program information can be corrected to suitable contents if a degree of an error is comparatively small, by changing the flow chart as described above. The user can make recording reservation targeted for a plurality of programs. Even in such a case, it is desirable that the first reservation information be associated to be divided into a plurality of second reservation information.

The program reservation apparatus as described above, or alternatively, such a program which can achieve a modified example thereof may be distributed after stored in a removable recording medium such as CD-ROM, DVD, or flash memory. In addition, part or whole of the program may be distributed via a communication network such as a cellular phone network. In such a case, the user can apply the present invention to the reservation apparatus by acquiring the program and loading it on the program reservation apparatus. Therefore, the recording medium may be accessible by an apparatus for distributing a program.

What is claimed is:

1. A program reservation apparatus comprising:
   a reservation setting unit configured to set first reservation information based on an input from an external device, wherein the first reservation information includes a recording start time and a recording duration time of a program;
   a program information receiving unit configured to receive plural program information items, each program information item including a recording start time;
   an extraction unit configured to extract, from the plural program information items received by the program information receiving unit, a program information item having a recording start time which coincides with the recording start time included in the first reservation information;
   a calculation unit configured to calculate a recording duration time of a first program indicated by the program information item extracted by the extraction unit;
   a comparing unit configured to compare the recording duration time included in the first reservation information and the recording duration time of the first program calculated by the calculation unit;
   a correcting unit configured to correct the first reservation information by replacing the recording duration time included in the first reservation information by the recording duration time of the first program calculated by the calculation unit when the comparing unit determines that the recording duration time of the first program calculated by the calculation unit is shorter than the recording duration time included in the first reservation information; and
   a recording unit configured to perform recording based on the first reservation information corrected by the correcting unit.

2. The program reservation apparatus according to claim 1, further comprising:
   a generation unit configured to generate second reservation information for recording a second program to be broadcasted following the first program when the comparing unit determines that the recording duration time of the first program calculated by the calculating unit is shorter than the recording duration time included in the first reservation information, and
   wherein the recording unit performs recording based on the first reservation information corrected by the correcting unit and the second reservation information.

3. The program reservation apparatus according to claim 2, wherein the generation unit sets a predetermined period of time elapsed from the recording start time included in the first reservation information as a recording start time of the second reservation information, said predetermined period of time corresponding to the recording duration time of the first program calculated by the calculation unit, and wherein the generation unit sets a period of time obtained by subtracting the recording duration time of the first program calculated by the calculation unit from the recording duration time of the second reservation information when the comparing unit determines that the recording duration time of the first program calculated by the calculation unit is shorter than the recording duration time included in the first reservation information.

4. A computer-readable recording medium having a computer program stored thereon that is executable by a computer to cause the computer to perform program reservation functions comprising:
   setting first reservation information based on an input from an external device, wherein the first reservation information includes a recording start time and a recording duration time of a program;
   receiving plural program information items, each program information item including a recording start time;
   extracting from the received plural program information items a program information item having a recording start time which coincides with the recording start time included in the first reservation information;
   calculating a recording duration time of a first program indicated by the extracted program information item;
   comparing the recording duration time included in the first reservation information and the calculated recording duration time of the first program;
   correcting the first reservation information by replacing the recording duration time included in the first reservation information by the calculated recording duration time of the first program when it is determined that the calculated recording duration time of the first program is shorter than the recording duration time included in the first reservation information; and performing recording based on the corrected first reservation information.

* * * * *